United States Patent
Wu et al.

(10) Patent No.: US 12,174,768 B2
(45) Date of Patent: Dec. 24, 2024

(54) PCI-E BUS STANDARD COMPLIANT MULTIFUNCTIONAL INTERFACE BOARD

(71) Applicant: INNODISK CORPORATION, New Taipei (TW)

(72) Inventors: Hsi-Hsi Wu, New Taipei (TW); Cheng-Chun Chang, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 42 days.

(21) Appl. No.: 18/296,067

(22) Filed: Apr. 5, 2023

(65) Prior Publication Data

US 2024/0168902 A1   May 23, 2024

(30) Foreign Application Priority Data

Nov. 22, 2022  (TW) .................................. 111144672

(51) Int. Cl.
*G06F 13/38* (2006.01)
*G06F 13/40* (2006.01)
*G06F 13/42* (2006.01)

(52) U.S. Cl.
CPC ........ *G06F 13/385* (2013.01); *G06F 13/4068* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 2008/0065805 A1* | 3/2008 | Wu | G06F 1/186 710/2 |
| 2011/0014881 A1* | 1/2011 | Yang | H04M 1/0266 455/90.3 |
| 2012/0033370 A1* | 2/2012 | Reinke | G06F 13/4068 361/748 |
| 2016/0334992 A1* | 11/2016 | Yashiro | G06F 3/0614 |
| 2020/0293195 A1* | 9/2020 | Noy | G06F 13/4221 |
| 2023/0309234 A1* | 9/2023 | Niitsuma | H05K 1/0215 |

* cited by examiner

*Primary Examiner* — Idriss N Alrobaye
*Assistant Examiner* — Dayton Lewis-Taylor
(74) *Attorney, Agent, or Firm* — Alston & Bird LLP

(57) ABSTRACT

A PCI-E bus standard compliant multifunctional interface board includes a substrate, a PCI-E connector, a storage device, a non-storage device and a signal dispatch device. The PCI-E connector is provided on the substrate and is configured to be electrically connected to a host. The storage device and the non-storage device are provided on the substrate. The signal dispatch device is provided on the substrate and includes: an upstream port, a downstream port and an I/O controller. The upstream port is electrically connected to the PCI-E connector. The downstream port is electrically connected to the storage device and/or the non-storage device. The I/O controller is electrically connected to the upstream port and the downstream port to control an electrical connection relationship between the host and the storage device and/or the non-storage device.

18 Claims, 4 Drawing Sheets

PCI-E BUS STANDARD COMPLIANT MULTIFUNCTIONAL INTERFACE BOARD

CROSS-REFERENCE TO RELATED APPLICATION AND CLAIM OF PRIORITY

The application claims the benefit of Taiwan Patent Application No. 111144672, filed on Nov. 22, 2022, at the Taiwan Intellectual Property Office, the disclosures of which are incorporated herein in their entirety by reference.

FIELD OF THE INVENTION

The present invention relates to a multifunctional interface board and, more particularly, to a PCI-E bus standard compliant multifunctional interface board.

BACKGROUND OF THE INVENTION

The Peripheral Component Interconnect Express (PCI-E) has become one of the most widely used bus standards on motherboards for electrical connections with personal computers' image control modules, solid-state drives (SSD), and Ethernet network appliances.

PCI-E has shown numerous improvements over the older standards, including higher maximum system bus throughput, lower I/O pin count and smaller physical footprint, native hot-swap functionality and so forth. Most importantly, each PCI-E device has independent lanes, which prevents data transmission from interfering with each other. Similar to a two-way highway, each lane is a sending/receiving data line. The PCI-E interface can transmit signals in multiple lanes simultaneously.

However, generally speaking, there are only a limited number of PCI-E sockets available on a motherboard, and these PCI-E sockets are often occupied by specific PCI-E devices such as image control modules. There is no space for more PCI-E devices on the motherboard.

Therefore, there is a need for a multifunctional interface board to solve the problem that the motherboard cannot be further expanded because it cannot be plugged with more devices that comply with PCI-E or other bus standards.

SUMMARY OF THE INVENTION

In view of the foregoing problems, one object of the present invention is to provide a multifunctional interface board with the capability of connecting at least one electronic device compliant with the PCI-E bus standard and electronic devices compliant with other bus standards to further expand the functions of the host.

In order to achieve the foregoing object, the present invention provides a PCI-E bus standard compliant multifunctional interface board, including a substrate, a PCI-E connector, a storage device, a non-storage device and a signal dispatch device. The PCI-E connector is provided on the substrate and electrically connected to a host. The storage device is provided on the substrate. The non-storage device is provided on the substrate. The signal dispatch device is provided on the substrate and includes an upstream port, a downstream port and an I/O controller. The upstream port is electrically connected to the PCI-E connector. The downstream port is electrically connected to the storage device and/or the non-storage device. The I/O controller is electrically connected to the upstream port and the downstream port to control an electrical connection relationship between the host and the storage device and/or the non-storage device.

In order to achieve the foregoing object, the present invention further provides a PCI-E bus standard compliant multifunctional interface board, including a substrate, a PCI-E connector, a built-in electronic device, at least one socket and a signal dispatch device. The PCI-E connector is provided on the substrate and electrically connected to a host. The built-in electronic device is provided on the substrate. The at least one socket is provided on the substrate and configured to provide an external electronic device with a pluggable connection. The signal dispatch device is provided on the substrate and includes an upstream port, a downstream port and an I/O controller. The upstream port is electrically connected to the PCI-E connector. The downstream port is electrically connected to the built-in electronic device and/or the at least one socket. The I/O controller is electrically connected to the upstream port and the downstream port and configured to control an electrical connection relationship between the host and the built-in electronic device and/or the external electronic device.

In order to achieve the foregoing object, the present invention further provides a PCI-E bus standard compliant multifunctional interface board, including a substrate, a PCI-E connector, a first connecting medium, a second connecting medium and a signal dispatch device. The PCI-E connector is provided on the substrate and electrically connected to a host. The first connecting medium is provided on the substrate and configured to connect a first electronic device compliant with one of PCI-E, USB and SATA bus standards. The second connecting medium is provided on the substrate and configured to connect a second electronic device compliant with one of PCI-E, USB and SATA bus standards. The signal dispatch device is provided on the substrate and electrically connected to the PCI-E connector, the first electronic device and the second electronic device. The signal dispatch device includes an I/O controller configured to control an electrical connection relationship between the host and the first electronic device and/or the second electronic device regardless of which bus standard the first electronic device or the second electronic device complies with.

As stated above, the multifunctional interface board of the present invention can not only connect at least one chip or external electronic device compliant with the PCI-E bus standard but also can connect chips or external electronic devices compliant with other bus standards to further expand the functions of the host by utilizing a signal dispatch device.

For further descriptions and advantages of the present invention, please refer to the subsequent drawings and embodiments, so as to understand the technical solutions of the present invention more clearly.

BRIEF DESCRIPTION OF THE DRAWINGS

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Please refer to all figures of the present invention when reading the following detailed description, wherein all Figures of the present invention demonstrate different embodiments of the present invention by showing examples, and help the skilled person in the art to understand how to implement the present invention. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification. Unless there are other restrictions defined in the specific example, the following definitions apply to the terms used throughout the specification.

Figure 1:
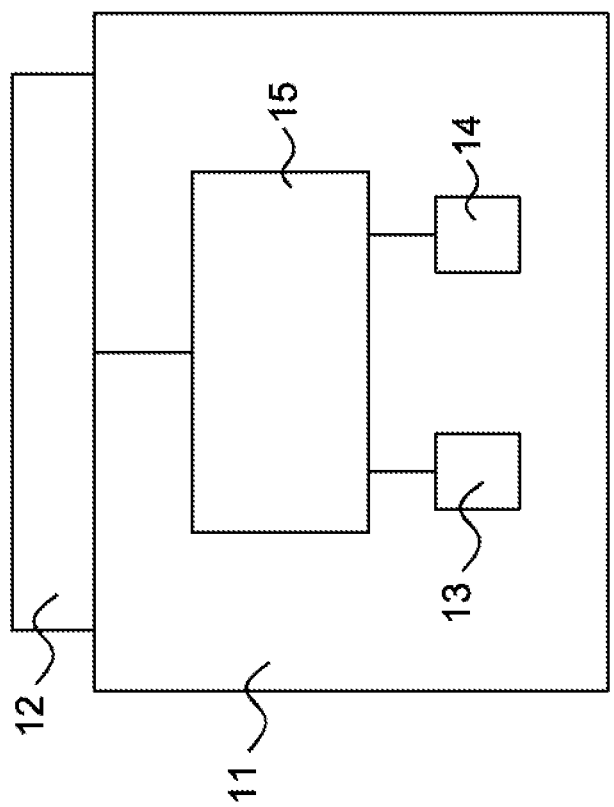
FIG. 1 is a schematic diagram of a multifunctional interface board according to a first embodiment of the present invention.

Please refer to FIG. 1, which is a schematic diagram of a multifunctional interface board according to a first embodiment of the present invention. In FIG. 1, the multifunctional interface board 1 in the first embodiment complies with the PCI-E bus standard and includes a substrate 11, a PCI-E connector 12, a storage device 13, a non-storage device 14 and a signal dispatch device 15. The PCI-E connector 12 is provided on the substrate 11, and pluggably and electrically connected to a host (not shown). At present, most hosts support the PCI-E bus standard and provide several PCI-E slots on the motherboard. The PCI-E slots include specifications such as ×1, ×2, ×4, ×8, and ×16, which means that 1 (one) to 16 (sixteen) lane(s) can be provided at the same time to transmit signals. The numbers of pins and lanes of a PCI-E slot varies according to its specifications. However, the PCI-E slots are well known to those with ordinary skill in the art, and will not be redundantly repeated herein.

In the first embodiment, the storage device 13 is a flash memory, which can be directly attached onto the substrate 11 by the surface mount technology (SMT), or can be inserted, according to the actual capacity requirement of the user, into a slot provided on the substrate 11 by the SMT. However, the present invention is not limited to the type, capacity and implementation of the storage device 13, and any person skilled in the art can make appropriate changes and/or modifications without departing from the spirit and scope of the present invention.

In the first embodiment, the non-storage device 14 is a communication module, an AI accelerator module, and/or an image control module, which can be respectively integrated on a single chip. More particularly, the communication module can be a Wi-Fi module, a Bluetooth module, a satellite navigation module, a near-field communication module or a wireless wide-area network module (WWAN). The non-storage device 14 in the form of a chip can be directly attached onto the substrate 11 by the SMT, or can be inserted, according to the actual performance requirement of the user, into a slot provided on the substrate 11 by the SMT. However, the present invention is not limited to the type, specification and implementation of the non-storage device 14, and any person skilled in the art can make appropriate changes and/or modifications without departing from the spirit and scope of the present invention.

Figure 2:
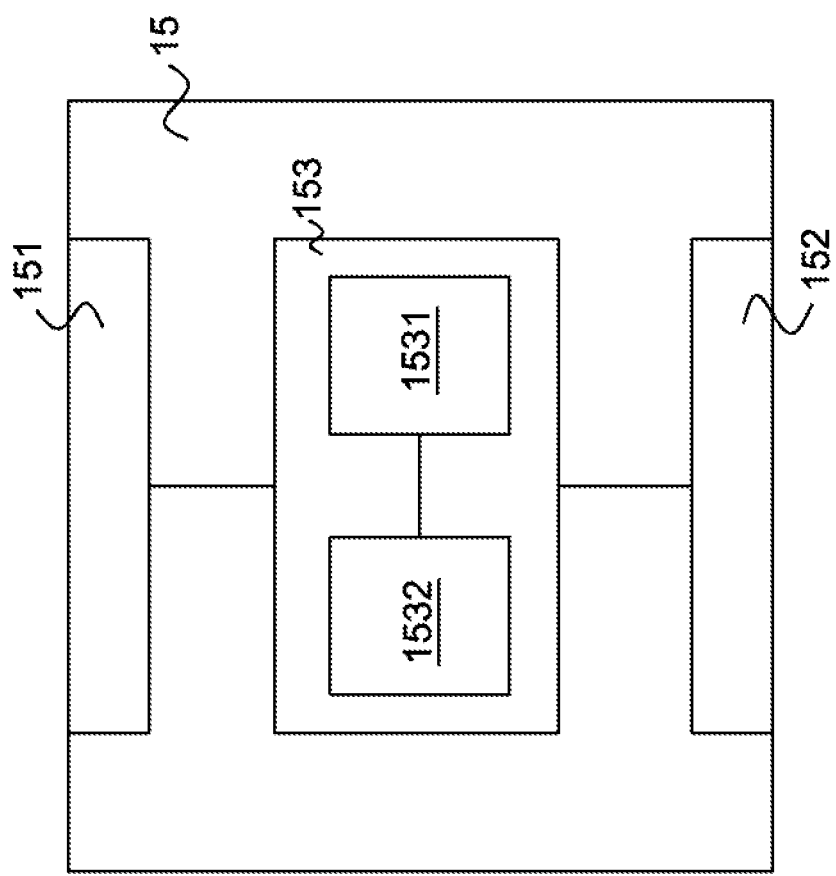
FIG. 2 is a schematic diagram of a signal dispatch device of the multifunctional interface board in FIG. 1.

Please refer to FIG. 2, which is a schematic diagram of a signal dispatch device of the multifunctional interface board in FIG. 1. In the first embodiment, the signal dispatch device 15 is provided on the substrate 11, and includes an upstream port 151, a downstream port 152 and an I/O controller 153. The upstream port 151 is electrically connected to the PCI-E connector 12 in FIG. 1. The downstream port 152 is electrically connected to the storage device 13 and/or the non-storage device 14. The I/O controller 153 is electrically connected to the upstream port 151 and the downstream port 152 to control an electrical connection relationship between the host (not shown) and the storage device 13 and/or the non-storage device 14. In the first embodiment, the upstream port 151 is compliant with the PCI-E bus standard, and the downstream port 152 is compliant with at least one of PCI-E, USB and SATA bus standards.

In the first embodiment, the I/O controller 153 can receive signals from the storage device 13 and/or the non-storage device 14 through the downstream port 152 to communicate with the host through the upstream port 151 and the PCI-E connector 12. For example, if the I/O controller 153 provides four lanes (×4) to the upstream port 151 and sixteen lanes (×16) to the downstream port 152, it means that the I/O controller 153 can simultaneously receive signals from the storage device 13, the non-storage device 14 and other electronic devices through sixteen lanes as the upper limit, and then transmits the signals to the host through four lanes.

In the first embodiment, the I/O controller 153 includes a processor 1531 and a crossbar switch 1532. The processor 1531 is configured to manage and dispatch signals to communicate with the host through the upstream port 151 and to communicate with storage device 13 and/or the non-storage device 14 through the downstream port 152. The crossbar switch 1532 is connected to the processor 1531 and is configured to be controlled by the processor 1531 to convert a PCI-E signal from the upstream port 151 into a signal compliant with at least one of PCI-E, USB and SATA bus standards and transmit the signal to the downstream port 152, and to convert a signal compliant with at least one of PCI-E, USB and SATA bus standards from the downstream port 152 into a PCI-E signal and transmit the PCI-E signal to the upstream port 151.

As previously stated, if the I/O controller 153 provides four lanes (×4) to the upstream port 151 and sixteen lanes (×16) to the downstream port 152, the multifunctional interface board of the present invention can be connected with more electronic devices when the number of lanes required to transmit the signals from the storage device 13 and the non-storage device 14 is less than sixteen.

Figure 3:
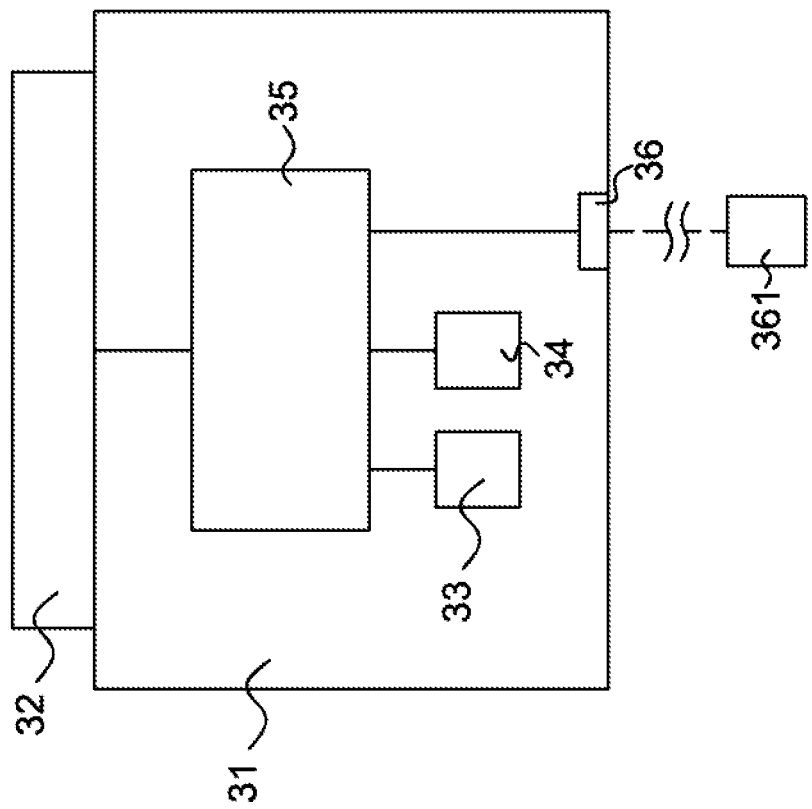
FIG. 3 is a schematic diagram of a multifunctional interface board according to a second embodiment of the present invention.

Please refer to FIG. 3, which is a schematic diagram of a multifunctional interface board according to a second embodiment of the present invention. In FIG. 3, the multifunctional interface board 3 in the second embodiment of the present invention is compliant with the PCI-E bus standard and includes a substrate 31, a PCI-E connector 32, a storage device 33, a non-storage device 34, a signal dispatch device 35, and at least one socket 36. The substrate 31, the PCI-E connector 32, the storage device 33, the non-storage device 34 and the signal dispatch device 35 of the multifunctional interface board 3 in the second embodiment are similar to corresponding elements of the multifunctional interface board 1 in the first embodiment, and will not be redundantly repeated herein. The main difference between the multifunctional interface board 3 in the second embodiment and the multifunctional interface board 1 in the first embodiment is that the multifunctional interface board 3 in the second embodiment further includes at least one socket 36. The at least one socket 36 is connected to the downstream port of the signal dispatch device 35 and is configured to provide at least one external electronic device 361 with a pluggable connection. The at least one socket 36 is compliant with at least one of PCI-E, USB and SATA bus standards. As previously stated, if the I/O controller 153 in FIG. 2 is used, four lanes (×4) are provided to the upstream port 151 and sixteen lanes (×16) are provided to the downstream port 152. In the second embodiment, the total number of lanes occupied by the storage device 33, the non-storage device 34, and the at least one external electronic device 361 connected to the at least one socket 36 cannot exceed sixteen.

In one embodiment, the external electronic device 361 can be a storage device or a non-storage device. For example, the storage device can be a solid-state drive (SSD) or a redundant array of inexpensive disks (RAID). For example, the non-storage device can be a communication module, an AI accelerator module, or an image control module. However, the present invention is not limited to the types, specifications and implementations of the external electronic devices, and any person skilled in the art can make appropriate changes and/or modifications without departing from the spirit and scope of the present invention.

Figure 4:
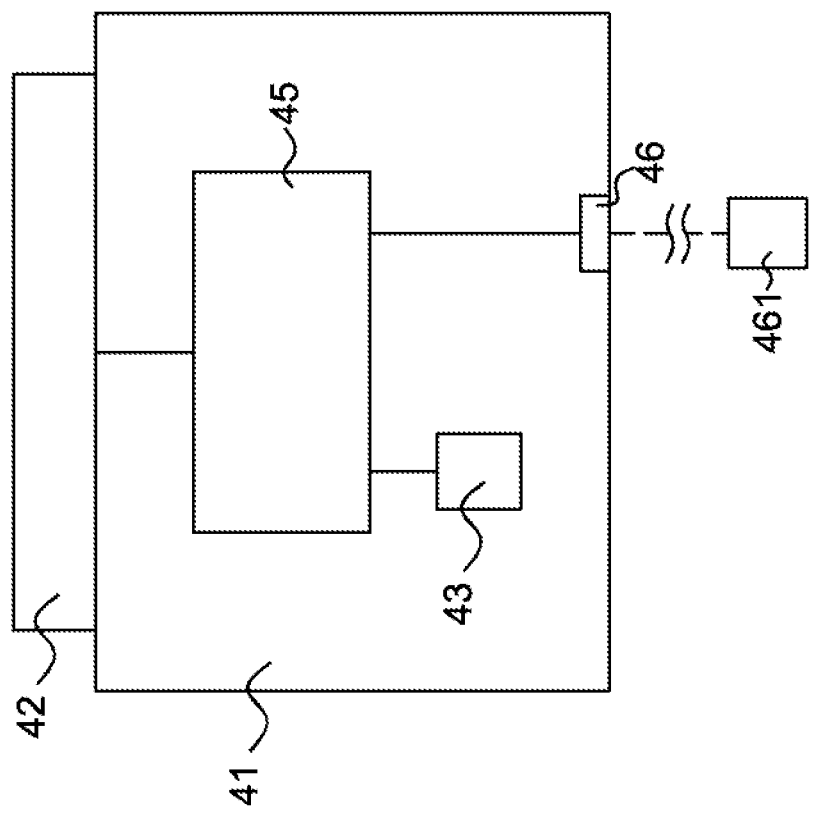
FIG. 4 is a schematic diagram of a multifunctional interface board according to a third embodiment of the present invention.

Please refer to FIG. 4, which is a schematic diagram of a multifunctional interface board according to a third embodiment of the present invention. The multifunctional interface board 4 in the third embodiment of the present invention is compliant with the PCI-E bus standard and includes a substrate 41, a PCI-E connector 42, a built-in electronic device 43, a signal dispatch device 45, and at least one socket 46. The substrate 41, the PCI-E connector 42 and the signal dispatch device 45 of the multifunctional interface board 4 in the third embodiment are similar to corresponding elements of the multifunctional interface board 1 in the first embodiment, and will not be redundantly repeated herein.

In the third embodiment, the built-in electronic device 43 can be a storage device. Preferably, the storage device is a flash memory, which can be directly attached onto the substrate 41 by SMT, or can be inserted, according to the actual capacity requirement of the user, into a slot provided on the substrate 41 by SMT. The at least one socket 46 is provided on the substrate 41 and is configured to provide at least one external electronic device 461 with a pluggable connection. More particularly, the at least one external electronic device 461 includes an external electronic device, which can be a storage device, a communication module, an AI accelerator module, or an image control module. For example, the storage device can be an SSD or a RAID. For example, the communication module can be a Wi-Fi module, a Bluetooth module, a satellite navigation module, a near-field communication module or a wireless wide-area network module, which is compliant with one of PCI-E, USB and SATA bus standards.

Alternatively, in the third embodiment, the built-in electronic device 43 may include a non-storage device, which can be, in the form of a chip, a communication module, an AI accelerator module, or an image control module. The communication module can be a Wi-Fi module, a Bluetooth module, a satellite navigation module, a near-field communication module or a wireless wide-area network module, which can be directly attached onto the substrate 41 by SMT, or can be inserted, according to the actual performance requirement of the user, into a slot provided on the substrate 41 by SMT. In the meantime, the external electronic device 461 can be a storage device or a non-storage device, which can be pluggably connected with the multifunctional interface board 4 through the socket 46 and is compliant with one of PCI-E, USB and SATA bus standards. Preferably, the storage device is an SSD or a RAID.

As can be seen from the above, the multifunctional interface board of the present invention uses the signal dispatch device to expand the functions of the host by connecting the chips or external electronic devices compliant with other bus standards in addition to the chips or external electronic devices compliant with the PCI-E bus standard.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

The invention claimed is:

1. A peripheral component interconnect express (PCI-E) bus standard compliant multifunctional interface board, comprising:
   a substrate;
   a PCI-E connector provided on the substrate and electrically connected to a host;
   a storage device provided on the substrate;
   a non-storage device provided on the substrate; and
   a signal dispatch device provided on the substrate and comprising:
      an upstream port electrically connected to the PCI-E connector;
      a downstream port electrically connected to the storage device and/or the non-storage device; and
      an I/O controller electrically connected to the upstream port and the downstream port to control an electrical connection relationship between the host and the storage device and/or the non-storage device,
   wherein the I/O controller comprises:
      a processor configured to manage and dispatch signals to communicate with the host through the upstream port and to communicate with the storage device and/or the non-storage device through the downstream port; and
      a crossbar switch connected to the processor and configured to be controlled by the processor to convert a PCI-E signal from the upstream port into a signal compliant with at least one of PCI-E, universal serial bus (USB) and Serial AT Attachment (SATA) bus standards and transmit the signal to the downstream port, and to convert a signal compliant with at least one of PCI-E, USB and SATA bus standards from the downstream port into a PCI-E signal and transmit the PCI-E signal to the upstream port.

2. The multifunctional interface board of claim 1, wherein the PCI-E connector is pluggably connected to the host.

3. The multifunctional interface board of claim 1, wherein the non-storage device is a communication module, an artificial intelligence (AI) accelerator module, or an image control module.

4. The multifunctional interface board of claim 3, wherein the communication module is a Wi-Fi module, a Bluetooth module, a satellite navigation module, a near-field communication module or a wireless wide-area network (WWAN) module.

5. The multifunctional interface board of claim 1, wherein the downstream port is compliant with at least one of PCI-E, USB and SATA bus standards.

6. The multifunctional interface board of claim 1, further comprising at least one socket connected to the downstream port of the signal dispatch device, configured to provide an external electronic device with a pluggable connection, and compliant with at least one of PCI-E, USB and SATA bus standards.

7. A peripheral component interconnect express (PCI-E) bus standard compliant multifunctional interface board, comprising:
   a substrate;
   a PCI-E connector provided on the substrate and electrically connected to a host;
   a built-in electronic device provided on the substrate;
   at least one socket provided on the substrate and configured to provide an external electronic device with a pluggable connection; and
   a signal dispatch device provided on the substrate and comprising:
      an upstream port electrically connected to the PCI-E connector;
      a downstream port electrically connected to the built-in electronic device and/or the at least one socket;
      an I/O controller electrically connected to the upstream port and the downstream port and configured to control an electrical connection relationship between the host and the built-in electronic device and/or the external electronic device;
      a processor configured to manage and dispatch signals to communicate with the host through the upstream port and to communicate with the built-in electronic device and/or the external electronic device through the downstream port; and
      a crossbar switch connected to the processor and configured to be controlled by the processor to convert a PCI-E signal from the upstream port into a signal compliant with at least one of PCI-E, universal serial bus (USB) and Serial AT Attachment (SATA) bus standards and transmit the signal to the downstream port, and to convert a signal compliant with at least one of PCI-E, USB and SATA bus standards from the downstream port into a PCI-E signal and transmit the PCI-E signal to the upstream port.

8. The multifunctional interface board of claim 7, wherein the PCI-E connector is pluggably connected to the host.

9. The multifunctional interface board of claim 7, wherein the built-in electronic device is a storage device.

10. The multifunctional interface board of claim 7, wherein the external electronic device is a redundant array of inexpensive disks (RAID), a communication module, an artificial intelligence (AI) accelerator module, or an image control module.

11. The multifunctional interface board of claim 10, wherein the communication module is a Wi-Fi module, a Bluetooth module, a satellite navigation module, a near-field communication module or a wireless wide-area network (WWAN) module.

12. The multifunctional interface board of claim 7, wherein the built-in electronic device comprises a communication module being a Wi-Fi module, a Bluetooth module, a satellite navigation module, a near-field communication module or a wireless wide-area network (WWAN) module.

13. The multifunctional interface board of claim 12, wherein the external electronic device is a storage device, an artificial intelligence (AI) accelerator module, or an image control module.

14. The multifunctional interface board of claim 13, wherein the storage device is a solid-state drive (SSD) or a redundant array of inexpensive disks (RAID).

15. The multifunctional interface board of claim 7, wherein the downstream port is compliant with at least one of PCI-E, USB, and SATA bus standards.

16. The multifunctional interface board of claim 7, wherein the at least one socket is compliant with one of PCI-E, USB, and SATA bus standards.

17. A peripheral component interconnect express (PCI-E) bus standard compliant multifunctional interface board, comprising:
   a substrate;
   a PCI-E connector provided on the substrate and electrically connected to a host;
   a first connecting medium provided on the substrate and configured to connect a first electronic device compliant with one of PCI-E, universal serial bus (USB) and Serial AT Attachment (SATA) bus standards;
   a second connecting medium provided on the substrate and configured to connect a second electronic device compliant with one of PCI-E, USB and SATA bus standards; and
   a signal dispatch device provided on the substrate, electrically connected to the PCI-E connector, the first electronic device and the second electronic device and comprising an I/O controller configured to control an electrical connection relationship between/among the host and the first electronic device and/or the second electronic device regardless of which bus standard the first electronic device or the second electronic device complies with; and
   a crossbar switch configured to convert a PCI-E signal from the PCI-E connector into a signal compliant with at least one of PCI-E, USB and SATA bus standards and transmit the signal to the first connecting medium and/or the second connecting medium, and to convert a signal compliant with at least one of PCI-E, USB and SATA bus standards from the first connecting medium and/or the second connecting medium into a PCI-E signal and transmit the PCI-E signal to the PCI-E connector.

18. The multifunctional interface board of claim 17, wherein the first electronic device is a storage or non-storage device built in or externally connected to the multifunctional interface board.

* * * * *